C. HERSCHEL.
WEIR.
APPLICATION FILED DEC. 6, 1919.
1,372,138. Patented Mar. 22, 1921.
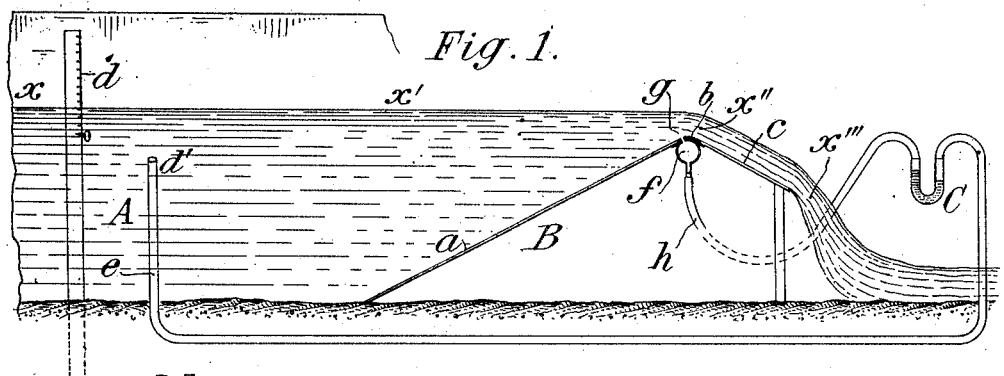
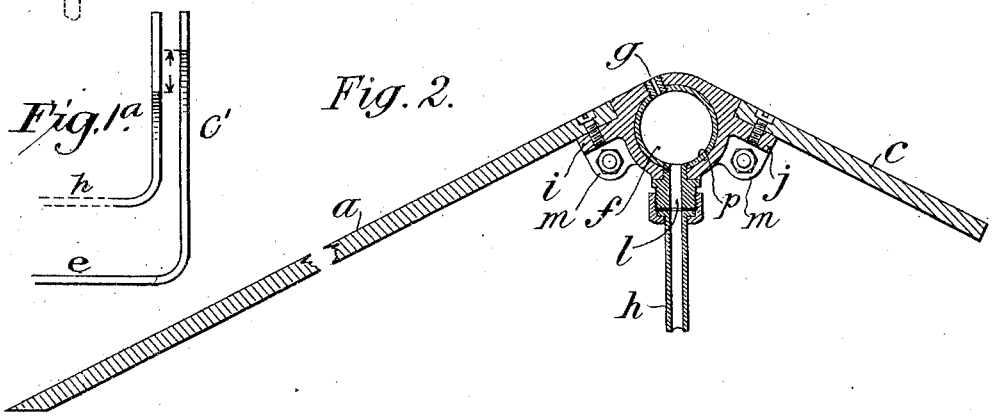
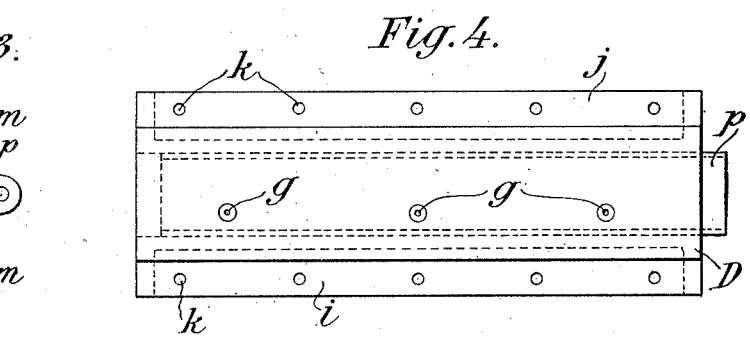
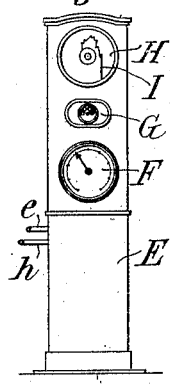
INVENTOR
Clemens Herschel,
By Attorneys,

UNITED STATES PATENT OFFICE.

CLEMENS HERSCHEL, OF GLEN RIDGE, NEW JERSEY.

WEIR.

1,372,138.  Specification of Letters Patent.  Patented Mar. 22, 1921.

Application filed December 6, 1919. Serial No. 342,940.

*To all whom it may concern:*

Be it known that I, CLEMENS HERSCHEL, a citizen of the United States of America, residing in Glen Ridge, in the county of Essex and State of New Jersey, have invented certain new and useful Improvements in Weirs, of which the following is a specification.

This invention provides certain improvements in weirs and accessory means used to measure the flow of water in open channels.

For the measurement of the flow of water in open channels it is customary to use a weir in the form of an upright partition transverse to the flow, sometimes contracted to a measured width less than the width of the channel or water-way, and having a sharp edge or weir crest over which the water flows. A point at a given distance upstream from the weir is established at a level equal to that of the weir crest, and measurements are taken of the depth of water above such level at such point. The flow (in cubic feet of water per second) is then determined by computation (or from a table computed) according to any one of several formulæ of which the one most in use in the United States is the Francis formula (or some modification thereof), which in its simplest form for a weir without end contractions, is $$Q = 3.33 l h^{3/2},$$

in which $Q$ is the flow in cubic feet per second, $l$ is the length of the weir in feet, and $h$ is the effective head in feet measured from the level of the crest to the level of still water above the weir. This formula, as also any of the other engineering formulæ in use in this and other countries, is true only within experimentally defined limits, and requires a difficult mathematical computation, involving usually the use of logarithms, to determine the result. With any given proportions of weir, and within the limits referred to, the different rates of flow, if charted, would describe not a straight line, but a curve.

The present invention aims to improve such means for measuring water in open channels, and to simplify the use thereof. In particular, it enables the flow to be determined according to a straight line formula, from 0 flow upward, thereby readily permitting the use of known indicating mechanisms for determining the flow, and of known registering and recording mechanisms for totalizing and recording the flow.

According to the present invention the weir, instead of abruptly dividing the flow by a vertical partition, has on the up-stream side a sloping surface which causes the water to gradually approach the weir crest; the weir crest, instead of being a sharp edge, is a curve over which the water flows with a gentle sweep, the curve being preferably the arc of a circle in cross-section; and on the down-stream side, instead of affording an abrupt fall for the water, it has a downwardly-sloping surface by means of which the water is conducted away from the weir crest in an accelerating stream. To determine the flow of water, the pressure of water flowing over the weir crest is deducted from the pressure due to the head of water above the level of the weir crest, and this difference of pressures is taken as the measure to be used in calculating the quantity of water flowing over the weir. The pressure at the weir crest may be taken in any suitable or convenient way. The preferable way is by forming one or more orifices through the weir crest leading directly or indirectly to some pressure-responsive or pressure measuring device. This is best done by forming a hollow or chamber within or below the weir crest, with which such orifices communicate, of sufficient capacity to average any inequalities of pressure from the individual orifices, and connecting the pressure-responsive element with such chamber. While a single orifice would serve the purpose, it is preferable to provide a plurality of such orifices distributed at uniform distances along the weir crest. The pressure-responsive device may be any known construction of water gage, differential manometer, or equivalent means for indicating a difference of pressures. Any known and suitable type of registering mechanism may be applied under control of such pressure-responsive device. Or some known and suitable recording means may be applied for recording the varying differences of pressures from time to time. As the present invention results in the generation of a differential pressure directly proportionate to the flow, these several instruments may be graduated or calibrated to read in terms of quantity flowing rather than in terms of pressure, as, for example, in cubic feet per second.

The invention readily lends itself to unit construction. Thus the weir crest may be made in units or segments of, for example, two feet in length, and as many such units may be united as will give a length equal to the width of the effective channel to which the weir is to be applied. The weir crest units may be made as metal castings. The sloping surfaces on the up-stream and down-stream sides of the crest may conveniently be made of wooden planks suitably supported and attached at their upper ends to the weir crest units; or they may be made of metal plates, or for permanent work may be of concrete or other construction. The weir crest units, if made of cast-iron, may advantageously be lined with brass tubing or otherwise rendered internally rust-proof.

The accompanying drawings show a suitable and preferable embodiment of the invention.

Figure 1 is a longitudinal section illustrating diagrammatically the application of the improved weir to a flume, raceway, or other open channel in which is flowing the water to be measured;

Fig. 1ᵃ shows one form of pressure-responsive means.

Fig. 2 is a vertical section transverse to the weir crest or longitudinally of the channel, showing the preferred construction of weir crest and associated parts of the weir;

Figs. 3 and 4 are respectively an end elevation and plan of a unit or segment of the weir crest;

Fig. 5 is an elevation, partly in longitudinal section, of a weir crest made up of three or more units or segments;

Fig. 6 is an elevation of a well-known mechanism for indicating, metering and recording a flow of water, which is applicable for use with my invention.

Referring to Fig. 1, A designates the channel through which water is flowing, B as a whole is the weir, and C or C' in Fig. 1ᵃ is a differential pressure-measuring device such as a water gage or gages. The weir B has an inclined portion $a$ on the up-stream side reaching preferably to the bottom of the channel, ascending at a suitable angle, say, for example, 2 horizontal to 1 vertical, as shown, to the weir crest $b$ which is curved in the arc of a circle, and an apron or descending incline $c$ leads thence for a suitable distance to conduct away the water from the crest. The up-stream water level is indicated at $x$, the descending water surface extending thence to the weir crest, is indicated at $x'$. The water flowing over the weir crest is indicated at $x''$, and the spent water flowing from the spillway is indicated at $x'''$.

In ordinary weir practice a scale $d$ is set on the up-stream side of the weir sufficiently distant therefrom to afford substantially still water and a substantially level water surface; its zero point is placed on a level with the weir crest; and measurements on this scale are taken from time to time for determining the effective head ($h$ in the formula above given). The present invention avoids the necessity of using the Francis formula or any modification thereof, with its necessity for intricate computation; or alternatively, the reference to flow tables computed from such formula. Instead, the difference in levels or pressures at $d$, and at the weir crest $b$ is taken as the determining factor in a simple straight-line formula. For taking the pressure at $d$ a duct (tube or conduit) $e$ is led from a suitable orifice $d'$ to a pressure-responsive element, which may be the gage or differential manometer C, which receives on one side the pressure from $e$ and on the other side that from the weir crest, so that it indicates the difference between these pressures.

The weir crest $b$ is curved preferably in the arc of a circle, so that the crest constitutes a segment of a cylinder. The curve which I have used successfully has a radius of two inches; but it is probable that curves of larger or smaller radius may be used with equal success. The ascending surface $a$ and the descending surface $c$ are preferably planes (although they might be curves of large radius), and join the curved crest tangentially so as to afford a smooth path for the water over the weir.

I have found from extensive and carefully conducted experiments made in the hydraulic laboratory of the Massachusetts Institute of Technology at Cambridge, Mass., that with any rate of flow from zero up to 9.55 cubic feet per second per foot in length of weir, (and presumably also for any larger rate of flow) the pressure generated at the weir crest deducted from that due to the water level at $x$ affords a differential pressure which is in direct ratio to the rate of flow; or, in other words, corresponds to a straight-line formula. This fact being determined, it is only necessary to provide means for measuring such pressure at any moment in order to readily determine the rate of flow. While various means might be provided for taking such pressure at the weir crest, the preferable means and that which I have used with success in said experiments is to communicate the pressure from the weir crest to some suitable pressure-responsive or measuring element such as a water gage. For this purpose any suitable orifice may be formed in the weir crest, and a duct or conduit led therefrom to the pressure-responsive device. Owing, however, to the existence of eddy currents or other local disturbances, it is preferable to use more than one such orifice, and preferably several or many, and connect the orifices in such manner that the pressure communicated therefrom may be averaged so as to conduct the mean thereof to the pressure-measuring device. For this purpose I provide a pressure chamber into which the several orifices lead, and from which a single duct may lead to the pressure-responsive device. In order that the orifices communicating with this chamber may be as short as practicable, and for other reasons, it is preferable to construct the chamber as a hollow within the weir crest, this being the construction shown in the drawings, where the pressure chamber is lettered $f$, and the orifices communicating with it are lettered $g$. The duct leading from the chamber $f$ to the water gage C is indicated at $h$ and shown in Fig. 1 as any suitable tube communicating at one end with the chamber $f$, and connected at the other end with one leg of the gage. To secure differential readings, the gage may, as shown, receive the weir-crest pressure at one leg, and up-stream pressure at the other leg.

It is preferable to make the orifices $g$ on a plane intersecting, at a right angle to the slope $a$, the tangential juncture of the ascending plane $a$ with the weir crest $b$.

The preferable construction of the weir crest is as a hollow body the upper face of which forms the arc-shaped crest curve, and the cavity just beneath forms the pressure chamber $f$, as shown in Fig. 2. To facilitate the union therewith of the planes $a$, $c$, the tubular crest member may be made with flanges $i$, $j$, for the attachment of the members of these planes. As in most instances it will be most convenient to make the planes $a$, $c$, of wooden planks, the flanges $i$, $j$ may well be perforated at intervals, as shown at $k$, to receive bolts for attaching such planks. For connecting the duct $h$ with the chamber $f$, the crest member may be provided with a nipple $l$ tapped into it in any convenient location, as, for example, on its under side, as shown.

For convenient commercial construction it is preferable that the weir crest member be made up of units or segments of given length which may be united by bolts or otherwise to afford any desired width of weir. An example of this construction is shown in Figs. 3, 4 and 5, where each segment D is shown as a casting of suitable length, say two feet, provided with two, three or more orifices $g$, with the flanges $i$, $j$, and with transverse flanges or ears $m$, $m$ at their ends for receiving bolts to unite the successive units end to end. In this way is built up a weir of suitable length, the opposite ends of which are closed by cap plates D', one of which is shown in Fig. 5. In order that the orifices $g$ and duct $h$ shall not become obstructed by rust, it is desirable that the weir units be made internally rust-proof either by making them of non-rusting metal, or, if made for cheapness, of a rustible metal such as cast iron, that they be lined with a rustless lining. The best lining means is a lining tube of brass or similar metal, shown at $p$. To facilitate the alining of the successive units, the brass liners may be made to protrude at one end so as to leave a corresponding space at the other, whereby the protruding end of one segment may enter the socket at the end of the next and thereby serve to aline the segments, as shown in Fig. 5. It is desirable where the orifices $g$ are formed, to introduce a brass bushing or plug and drill this out to form the orifice, as shown in Fig. 2.

The formula for the determination of the flow of water over a weir of the construction and proportions shown, is $$Q = 5.5d,$$

where Q equals cubic feet per second per foot in length of weir; and $d$ equals the depression, i. e., the difference between the pressure at the up-stream point ($d'$ in Fig. 1) and the weir crest pressure (at $g$, $f$, Fig. 1). With other proportions of weir (that is, with a different slope for the approach, or a different radius for the crest curve, possibly with a different slope for the discharge), it may be that some change in this coefficient may be required. But in any case my experiments indicate that the formula will be a simple straight-line formula, so long as the conditions are such that the water may flow to the crest in a smooth unobstructed stream of gradually increasing velocity, may pass smoothly over the crest, may fall away therefrom in a steady stream without pocketing air beneath it, and the orifices $g$ are bored at right angles to the approach plane leading to the weir crest. These conditions may be met where the approach and discharge are not necessarily plane surfaces, such surfaces being, however, used by preference because of their ease of construction.

The use of a difference of height of water elevations at $d$ and $b$, or of such described water pressures, according to the straight-line resultant formula as stated, has the advantage, among others, that it enables simple mechanisms already manufactured and on the market to be availed of to indicate, register and (or) record the discharge of the stream of water under observation. Thus, instead of a differential water gage, a suitable indicator may be used. For registering the flow during any period of time, any known integrating meter having a suitable registering train may be used. For recording the fluctuations of flow from time to time, a dial recorder may be used, whereby a line may be traced on a recording dial or sheet. These several mechanisms are well known and in common use in connection with various metering systems, as, for example, in connection with the well-known Venturi water meter. To illustrate the application of such mechanisms to the present invention, I show in Fig. 6 an elevation of these mechanisms as commonly used with the Venturi water meter. Referring to this figure, the casing E incloses within it the operating mechanism to which are connected tubes or ducts $e$ $h$ (see Fig. 1), and within which is a pressure-responsive means responding to the difference in pressures and controlling in the well-known manner the hand of an indicator F which traversing a suitably graduated dial, indicates at any moment the rate of flow; also controlling an integrating meter G having the usual counting mechanism and dials from which may be read the total flow over any period of time; and also controlling the hand I of a chart recorder H comprising a disk carrying a chart divided into hours and revolved once in 24 hours (or other period), according to the usual practice, and on which a pen or pencil carried by the arm I traces a line which charts the flow in the manner well understood with such recording systems. The indication of these mechanisms is introduced to illustrate the facility with which such known indicating, registering and recording mechanisms may be operated under control of the means provided by the present invention.

The invention is not limited to the precise mode of application herein set forth, it being susceptible of a considerable range of modification according to conditions and the judgment or wishes of the engineer in any given instance, all within the scope of the appended claims.

I claim as my invention:—

1. As a means of measuring the flow of water in open channels, a weir having an orifice in its crest and means responsive to the pressure at such orifice, whereby the difference between such pressure and that at a point upstream may be taken to determine the rate of flow.

2. A means according to claim 1, the weir thereof having on the up-stream side an upwardly sloping surface adapted to cause the water to gradually approach the weir crest.

3. A means according to claim 1, the weir thereof having its crest in the form of a convex curve.

4. A means according to claim 1, comprising a weir having an upwardly sloping approach and its crest in the form of a convex curve, the sloping surface and crest-curve meeting tangentially.

5. A means according to claim 1, the weir thereof having on the up-stream side an upwardly sloping surface adapted to cause the water to gradually approach the weir crest, and having on the down-stream side a downwardly sloping surface for conducting the water away from the weir crest.

6. As a means of measuring the flow of water in open channels, a weir having a rounded crest with an orifice therein, pressure responsive means, a connection from said means to said orifice, and a connection from a point upstream to said pressure responsive means, whereby to determine the difference between the pressures at said orifice and at said point upstream.

7. A means according to claim 1, the weir thereof having an upwardly sloping approach and a convexly curved crest, with an orifice at the junction of such approach and crest and at right angles to the plane of the approach, and a duct communicating pressure from such orifice to the pressure-responsive means.

8. A weir having on its up-stream side an upwardly sloping surface, and orifices through its crest, a chamber with which such orifices communicate, and a pressure-responsive means receiving the pressure from such chamber.

9. A weir having its crest hollow, with orifices communicating from the outer surface of the crest to the hollow space or chamber, and means for determining the fluid pressure in the latter.

10. A weir having an orifice through the weir crest, a pressure-responsive means, a conduit conducting to said means on one side the pressure from such orifice and a conduit conducting to said means on the other side the pressure from a point upstream, and said means adapted to respond to the difference of said pressures.

11. The combination according to claim 10, with indicating means operated by the pressure-responsive means for indicating the rate of flow.

12. The combination according to claim 10, with recording means operated by the pressure-responsive means to record the variations in the rate of flow.

13. The combination according to claim 10, the weir thereof having an upwardly sloping approach and a convexly curved crest, with the orifice at the junction of such approach and crest and directed at right angles to the plane of the approach.

14. A weir having a longitudinally horizontal crest convexly curved in cross-section, divided longitudinally into interfitting segments each formed with a longitudinal passage and with an orifice opening therefrom to the outer surface of the crest, the longitudinal passages of adjoining segments communicating with one another.

15. A weir crest divided longitudinally into interfitting segments each formed with a chamber, and an orifice communicating through the weir crest with such chamber.

16. A hollow weir crest divided longitudinally into interfitting segments, each formed with a tubular external portion and a tubular lining, the latter projecting at one end from one segment and adapted to enter the end of the next segment, and an orifice communicating through the weir crest into the inclosed chamber, and formed through the external part and inner lining.

17. A weir having a rounded crest with an upwardly sloping approach, and an orifice at the junction of said approach with the curve of the crest, a conduit leading from said orifice, and a pressure-responsive device, receiving the pressure from said conduit.

In witness whereof, I have hereunto signed my name.

CLEMENS HERSCHEL.